Sept. 20, 1932.   B. H. WHITE   1,878,355
CHILD'S AMUSEMENT DEVICE
Original Filed July 7, 1930
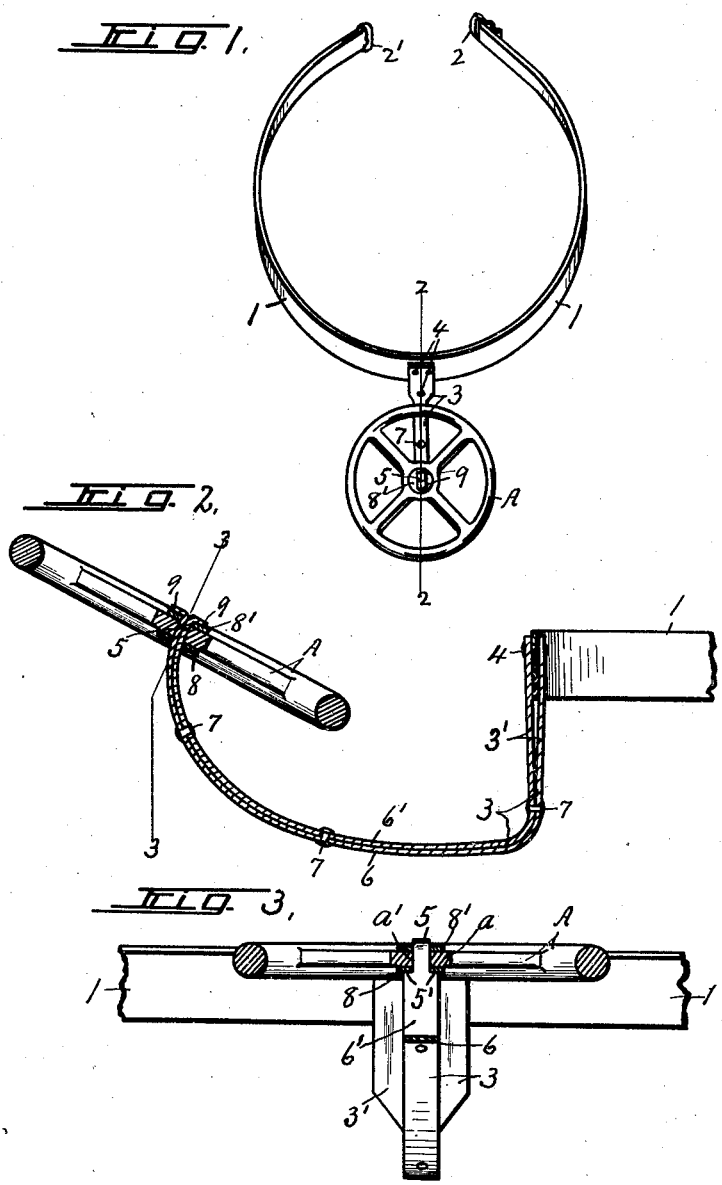

Patented Sept. 20, 1932

1,878,355

UNITED STATES PATENT OFFICE

BURT H. WHITE, OF SYRACUSE, NEW YORK

CHILD'S AMUSEMENT DEVICE

Application filed July 7, 1930, Serial No. 465,944. Renewed July 25, 1932.

This invention relates to an amusement device adapted to be used more particularly by children to imitate the movements of the steering wheel of motor vehicles such as automobiles and water craft.

The main object is to provide a simple and comparatively inexpensive device of this character capable of being easily and quickly attached to and detached from the body of the child and provided with a revoluble wheel supported in front of the attaching means within easy reaching distance of the child so that it may be rotated in reverse directions in imitation of the movements of the steering wheel of a motor vehicle.

Another object is to support the wheel upon the front end of a resilient bracket or equivalent supporting member having its rear end attached to the front portion of a belt or equivalent attaching means which is secured in position around the body of the child to be carried by said child when riding in the vehicle, or in any other position in which the child may be placed, with a minimum liability of injury in the use thereof.

Other objects and uses relating to specific parts of the device will be brought out in the following description.

In the drawing:

Figure 1 is a top plan of the detached amusement device showing the various features of my invention.

Figure 2 is an enlarged vertical sectional view taken in the plane of line 2—2, Figure 1, the ends of the belt being broken away.

Figure 3 is a sectional view taken in the plane of line 3—3, Figure 2.

As illustrated, this device comprises a flexible belt —1— of any suitable material having its ends provided with cooperative buckle sections —2— and —2'— whereby the belt may be applied to and released from the body of the child.

A U-shaped bracket —3— of resilient metal has one of its arms secured by rivets or equivalent fastening means —4— to the central portion of the belt —1— to extend downwardly, forwardly and upwardly therefrom and has its distal end slightly inclined upwardly and rearwardly and reduced in width to form a journal bearing —5— upon which is rotatably mounted a wheel —A—.

As illustrated, the bracket —3— is laminated and is composed of outer and inner strips —6— and —6'— of flat sheet metal secured together at intervals throughout its length by rivets —7—.

These layers —6— and —6'— are preferably made of thin strips of aluminum alloy or other highly resilient metal to allow various portions thereof to readily yield when brought into contact with other objects and thereby to reduce the liability of accident when placed in operative position upon the child.

The outer and inner layers of the rear arm as —3'— of the bracket —3— are slightly divergent upwardly and are secured by the rivets —4— to the intermediate portion of the belt —1— as shown more clearly in Figure 2, said rear arm —3'— being relatively wider than the remaining portions of the bracket to afford relatively broad bearings upon adjacent portions of the belt to assist in holding the bracket and belt against relatively lateral turning movement and at the same time to form correspondingly broad bearings of the bracket against the body of the child to reduce the liability of accident and also to aid in holding the bracket in an upright position.

The wheel —A— is provided with a hub —a— having a central circular opening —a'— for receiving the reduced end or bearing —5— on the upper front end of the backet —3— and permitting the wheel to turn about the bearing.

The reduction in the width of the upper front end of the bracket —3— to form the bearing —5— incidentally produces shoulders —5'— for limiting the downward movement of the wheel —A— upon said bearing.

A washer —8— is interposed between the shoulders —5'— and underside of the hub —a— to enable the wheel to turn freely about its bearing —5— and also to reduce wear upon the adjacent portion of the bracket.

A similar washer —8'— is engaged with the upper surface of the hub —a— of the wheel and is provided with a central opening through which the upper end of the bearing —5— extends. That is, the metal strips —6— and —6'— are continued to the upper front end of the bracket through the hub of the wheel —A— to form the bearing —5—, the upper ends of the opposite sections of the said bearing being bent laterally in opposite directions against the upper face of the adjacent washer —a'— to form retaining shoulders —9— for holding the wheel against upward displacement from the bracket.

The front portion of the bracket —3— is preferably curved upwardly and rearwardly so that its bearing —5— may be similarly inclined to support the wheel —A— in an inclined plane at right angles thereto, or, in a forwardly and upwardly inclined plane similar to that of the steering wheel of a motor vehicle for convenience of manipulation by the child.

*Operation*

All of the parts of the device are assembled as a unit in the manner described so that when it is desired to use the same it is simply necessary to fasten the belt —1— around the waist or body of the child with the bracket —3— and wheel —A— directly in front so that the wheel maybe readily engaged and operated by either hand or both hands of a child.

When the device is not in use the belt —1— may be readily detached from the body of the child and the entire device stored away in a relatively small space within the vehicle or in any other depository.

What I claim is:

1. An amusement device of the character described comprising a band adapted to be attached to the body of the user, a bracket composed of inner and outer layers of relatively thin sheet metal having the layers at one end secured to the inner and outer faces of the intermediate portion of the band, the opposite ends of the layers being reduced in width to form a bearing, and a wheel rotatably mounted on said bearing, the ends of the layers forming said bearing being bent laterally in opposite directions to hold the wheel against upward displacement.

2. A child's amusement device comprising a belt adapted to be fastened around the body of the child, a bracket attached to the belt and extended downwardly, forwardly and upwardly therefrom, and a hand-wheel journaled on the front end of the bracket to revolve about a downwardly and forwardly inclined axis and in a plane at an acute angle to the plane of the belt when the latter is fastened to the body of the child.

3. A child's amusement device comprising a belt adapted to be fastened around the body of the child, a bracket attached to the belt and extended downwardly, forwardly and upwardly therefrom, and a hand-wheel journaled in the front end of the bracket to be rotated by the child while wearing the belt.

In witness whereof I have hereunto set my hand this 3d day of July 1930.

BURT H. WHITE.